Patented June 27, 1939

2,163,778

UNITED STATES PATENT OFFICE 2,163,778

PROCESSED CHEESE AND METHOD OF PREPARING THE SAME

Fritz Draisbach, Ludwigshafen-on-the-Rhine, Germany

No Drawing. Application June 2, 1937, Serial No. 146,122. In Germany June 4, 1936

8 Claims. (Cl. 99—162)

As is well known, processed cheese is produced by grinding hard, soft or curd cheese very fine and mixing this mass in an agitator with water and melting salt, and heating in a heating kettle. The ground cheese mass is completely melted to a homogeneous paste, capable of being poured. This homogeneity is assured through the addition of melting salt, which prevents the cheese mass from dividing into its ingredients: casein, fat and water.

The sodium salts of citric acid, tartaric acid, phosphoric acid, pyrophosphoric acid, and metaphosphoric acid have proved good melting salts and these salts are used alone or, more frequently, in mixtures with one another. Calcium oxide and calcium carbonate combined with citric acid produce a bright, spreadable cheese.

The temperature of the melting process is about 65–85° C. and is determined by the quality of the raw materials and the desired finished products. One cannot permit whole-fat cheese, for example Emmenthaler, to go over 75° without obtaining a strong "cooked" taste in the final product.

The attainment of a high melting temperature of 80–90° C. is, however, very desirable for fine grades of cheese, rich in fat, as for example Emmenthaler, Gorgonzola, or Cheddar because the higher sterilizing temperature assures a better keeping of the melted cheese, but this has not been possible with the hitherto known melting salts for the above-mentioned reasons.

It has now been found that for this purpose complex anhydrous calcium-sodium-phosphates and magnesium-sodium-phosphates are very suitable melting salts. One can prepare these by heating sodium dihydrogen-orthophosphate or sodium monohydrogen-orthophosphate with calcium oxide or calcium carbonate or with magnesium oxide or carbonate to quiet melting at 700–900° C. At this heat all the water of constitution escapes and a complex alkaline-earth sodium-phosphate forms, which after being ground fine, stands out immediately as suitable for the melting of cheese.

These products can be prepared to have any desirable pH value, by varying the proportions of the constituents, sodium dihydrogen orthophosphate and sodium monohydrogen orthophosphate. By varying the proportions of the constituents one can produce water soluble-alkaline-earth-metaphosphates, pyrophosphates, polyphosphates, or mixtures thereof. Only so much of the calcium oxide or carbonate is used as will yield a satisfactorily soluble product.

Thus a mixture of seven parts calcium carbonate or magnesium carbonate and 100 parts of sodium dihydrogen orthophosphate yields when heated to 700–900° C. a suitable product for many types of cheese. Further, I find that these new salts possess an outstanding buffering ability which enables the pH and acid value of the cheese to be stable and wholly unresponsive to change.

The advantage over all known melting salts exists in that one can heat a cheese rich in fat, as for example fine Emmenthaler, without difficulty to 80–90° C., without obtaining a "cooked" taste in the finished product.

The stability of processed cheese prepared in this way is great since the bacteria and other organisms hitherto active can be destroyed. The good buffering ability of the new salts has also a favorable influence on the taste of the melted cheese inasmuch as the pH and acid value of the original cheese is not changed, whereby the proper specific taste factors are fully perceived.

The hitherto known melting salts, containing lime salts, were water-insoluble substances. In contrast to this the new melting salt is completely soluble, giving a clear solution.

One can use the new melting salts either alone or, in case of necessity, jointly with other known melting salts. One has thus the advantage that these can then be used at higher melting temperatures.

The invention is not limited to the example given but may be otherwise embodied within the scope of the following claims.

I claim:

1. A method of preparing processed cheese which consists in homogenizing cheese at a pasteurizing temperature with an homogenizing salt consisting of a soluble complex sodium-alkaline-earth-phosphate.

2. A method of preparing processed cheese which consists in homogenizing cheese at a pasteurizing temperature with a homogenizing salt consisting of a soluble complex sodium-calcium phosphate.

3. A method of preparing processed cheese which consists in homogenizing cheese at a pasteurizing temperature with a homogenizing salt consisting of a complex sodium-calcium metaphosphate.

4. Pasteurized homogenized cheese containing a water soluble sodium-alkaline-earth phosphate.

5. Pasteurized homogenized cheese containing a water soluble sodium-alkaline-earth metaphosphate.

6. Pasteurized homogenized cheese containing a water soluble sodium-alkaline-earth pyrophosphate.

7. Pasteurized homogenized cheese containing a water soluble sodium-alkaline-earth polyphosphate.

8. A method of preparing processed cheese which consists in homogenizing a cheese which is rich in fat at a pasteurizing temperature of at least 80° C. with a homogenizing salt consisting of a soluble complex sodium-alkaline-earth phosphate.

FRITZ DRAISBACH.